(12) United States Patent
O'Hara et al.

(10) Patent No.: US 6,729,676 B1
(45) Date of Patent: May 4, 2004

(54) HYBRID COMPOSITE REINFORCED DOOR INNER PANEL

(75) Inventors: Tim O'Hara, Rochester Hills, MI (US); Mike Shinedling, Oxford, MI (US); Douglas L Denton, Rochester Hills, MI (US); Steve Rowden, Rochester, MI (US); Daniel J Pearlman, Oxford, MI (US)

(73) Assignee: DaimlerChrysler Corporation, Auburn Hills, MI (US)

( * ) Notice: Subject to any disclaimer, the term of this patent is extended or adjusted under 35 U.S.C. 154(b) by 0 days.

(21) Appl. No.: 10/349,291

(22) Filed: Jan. 22, 2003

(51) Int. Cl.[7] .................................................. B60J 5/04
(52) U.S. Cl. ..................... 296/146.5; 296/191
(58) Field of Search ........................... 296/146.5, 146.1, 296/146.7, 146.8, 191; 49/502

(56) References Cited

U.S. PATENT DOCUMENTS

| | | |
|---|---|---|
| 4,811,517 A | 3/1989 | Eckert et al. |
| 4,860,496 A | 8/1989 | Hellriegel |
| 4,861,208 A | 8/1989 | Boundy |
| 5,127,191 A | 7/1992 | Ohta |
| 5,505,024 A | 4/1996 | DeRees et al. |
| 5,555,677 A | 9/1996 | DeRees et al. |
| 5,570,922 A | 11/1996 | DeRees et al. |
| 5,573,297 A | 11/1996 | DeRees et al. |
| 5,581,947 A | 12/1996 | Kowall et al. |
| 5,853,857 A | 12/1998 | Mahmood et al. |
| 5,906,409 A | 5/1999 | DeRees et al. |
| 6,000,118 A | 12/1999 | Biernat et al. |
| 6,053,561 A | 4/2000 | Hojnowski et al. |
| 6,129,410 A | 10/2000 | Kosaraju et al. |
| 6,248,200 B1 | 6/2001 | Dailey et al. |

OTHER PUBLICATIONS

"Applications Of Carbon Fiber SMC For The 2003 Dodge Viper" published by the Society Of Plastic Engineers, Sep. 2002.

Primary Examiner—Joseph D. Pape
(74) Attorney, Agent, or Firm—Donald J. Wallace

(57) ABSTRACT

A door panel for a motor vehicle comprises a front portion and a rear portion connected to the front portion. The front portion comprises carbon fiber sheet molding compound, and the rear portion comprises sheet molding compound containing glass fibers.

11 Claims, 2 Drawing Sheets

HYBRID COMPOSITE REINFORCED DOOR INNER PANEL

TECHNICAL FIELD OF THE INVENTION

This invention relates generally to doors for motor vehicles, and relates more particularly to a hybrid composite reinforced door inner panel.

BACKGROUND OF THE INVENTION

Conventional doors for motor vehicles generally have been constructed on an element by element basis requiring a sequence of operations during an assembly line process. The main door unit usually comprises a thin metal stamping forming an inner panel, while an outer panel is hemmed around the marginal edges of the inner panel. The automotive industry is continually trying to design lightweight door structures that provide high volume economic production together with good stiffness-to-weight ratios. For example, U.S. Pat. No. 5,581,947 teaches a lightweight vehicle door including, in one form, outer and inner plastic panels bonded together with the inner panel molded with upright forward, aft and intermediate frame portions. Motor vehicle doors have also been constructed with resin transfer molded inner or outer panels, with large steel panels on the hinge pillar and latch pillar for strength and stiffness. Other doors have used sheet molding compound and smaller steel reinforcements.

SUMMARY OF THE INVENTION

The present invention is a door panel for a motor vehicle. The door panel comprises a front portion and a rear portion connected to the front portion. The front portion comprises carbon fiber sheet molding compound, and the rear portion comprises sheet molding compound containing glass fibers.

Accordingly, it is an object of the present invention to provide a door panel of the type described above that reduces door sag.

Another object of the present invention is to provide a door panel of the type described above that reduces permanent deflection.

Still another object of the present invention is to provide a door panel of the type described above that eliminates any need for extensive hinge pillar reinforcement.

Still another object of the present invention is to provide a door panel of the type described above that weighs less than conventional door panels.

These and other features and advantages of the invention will become further apparent from the following detailed description of the presently preferred embodiments, read in conjunction with the accompanying drawings. The detailed description and drawings are merely illustrative of the invention rather than limiting, the scope of the invention being defined by the appended claims and equivalents thereof.

DETAILED DESCRIPTION OF THE PRESENTLY PREFERRED EMBODIMENTS

Figure 1:
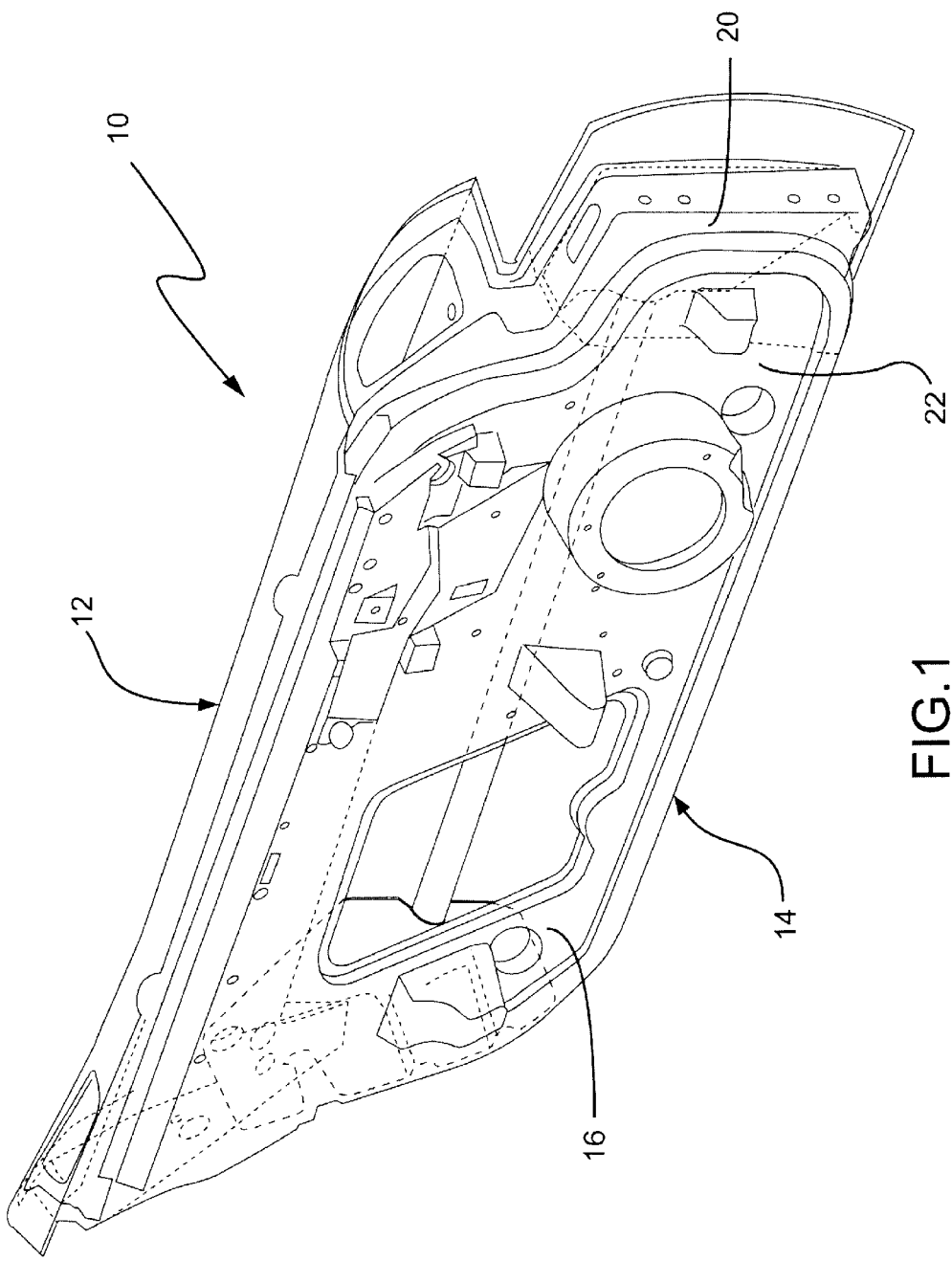
FIG. 1 is a perspective view of a door panel assembly according to the present invention.
Figure 2:
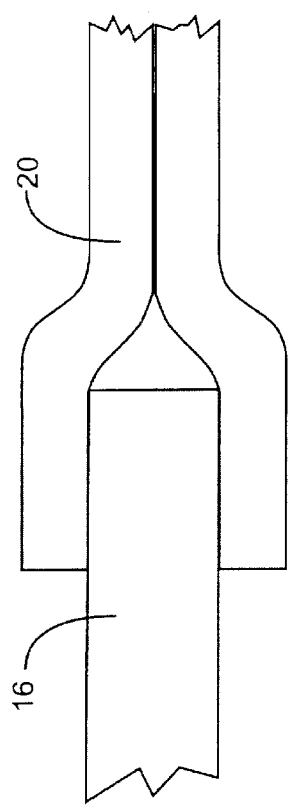
FIG. 2 is a partial cross-sectional view of an inner door panel of the door panel assembly.

FIGS. 1 and 2 show one embodiment 10 of a door panel assembly according to the present invention for a motor vehicle. The door panel assembly 10 includes a door outer panel 12 connected to a door inner panel 14. The door outer panel 12 is preferably compression molded from a sheet molding compound (SMC) containing only glass fiber reinforcement. The door inner panel 14 has a rear portion 16 running about 80% of the length of the door, a front portion 20 running the remaining length of the door, and a blended substrate joint 22.

The rear portion 16 of the door inner panel 14 preferably comprises conventional density or low density SMC containing glass fibers. The front portion 20 of the door inner panel 14 is preferably formed from a carbon fiber sheet molding compound (CFSMC) that is compounded and molded in a manner similar to conventional structural-grade glass fiber SMC. In particular, it may be desirable to form the front portion 20 from two CFSMC materials. The first material is a toughened vinyl ester resin with 25 millimeters (mm) random chopped 12K PAN based carbon fiber tows available from Quantum Composite of Bay City, Michigan under the brand name AMC-8590. The second material, also available from Quantum Composite under the brand name AMC-8595, contains a continuous, unidirectional cross-stitched mat with the same 12K carbon fibers and the same toughened vinyl ester matrix as AMC-8590.

In one embodiment, the door inner panel is formed with 0.45 kg of carbon fiber SMC. The part is compression molded and cured at temperatures of about 145 to 155 degrees Centigrade. Cure times are about 1 to 3 minutes. AMC-8590 requires 70% to 90% of the mold to be covered with the charge in order to minimize flow lines. AMC-8595 does not flow in the fiber direction. Consistent charge preparation and placement are advantageous to the structural performance of the molded part.

The primary advantages of carbon fibers in SMC are higher modulus and lower specific gravity relative to glass fibers. The modulus of commercial-grade carbon fibers is approximately 230 Gpa, which is about three times as high as the modulus of E-glass fibers. In addition, the 1.8 specific gravity of carbon fibers is about 70% of the specific gravity of glass fibers. These properties of carbon fibers translate into thinner and lighter composite structures with the appropriate strength and stiffness characteristics. Particular properties of AMC-8590 and 8595 are available from a paper entitled Applications of Carbon Fiber SMC For The 2003 Dodge Viper, published by the Society of Plastics Engineers in September 2002 and incorporated herein by reference. In addition to or in lieu of reinforcing carbon fibers, the present invention also contemplates the use of other materials such as Kevlar or other fibers.

Figure 3:
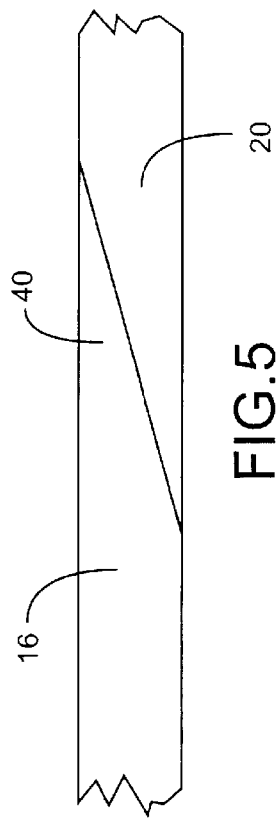
FIG. 3 is a schematic view of a partial charge pattern for forming a joint of the door panel assembly.
Figure 4:
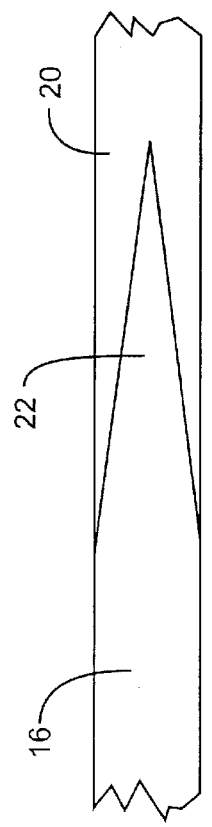
FIG. 4 is a schematic view of an alternative charge pattern.
Figure 5:
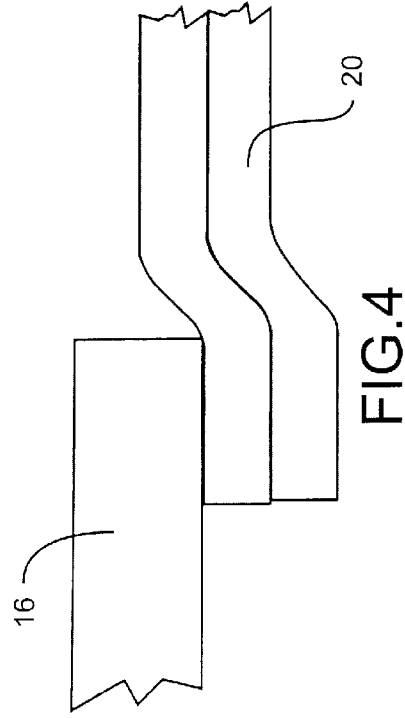
FIG. 5 is a schematic view of a joint formed by the charge pattern shown in FIG. 4.

The molded joint 22 joins the glass fiber reinforced composite portion 16 and the carbon fiber SMC portion 20. In a preferred embodiment, the door inner panel is about 2.5 mm thick, while an approximately 25 mm to 50 mm section of the rear portion 16 is inserted within a two-ply stack section of the front portion 20 such that the resulting joint 22 is in the range of about 75 mm plus or minus 25 mm long. The insert joint 22 is preferably formed by laying a charge pattern in the mold as shown in FIG. 3, with the extent of the overlap being between about 25 mm and 50 mm. This overlapping of carbon and glass materials in a tongue and groove configuration maximizes strength while minimizing warp. The joint demonstrates strength comparable to that of the SMC with glass fibers. The present invention also contemplates an overlap charge pattern as shown in FIG. 4, however, which results in a molded overlap joint 40 as shown in FIG. 5.

The door panel of the present invention thus provides a hybrid blending of glass fiber and carbon fiber reinforcement in one composite molding to achieve the added strength and stiffness of carbon, particularly in the high strain energy areas of the door panel, without the cost of molding the entire part in carbon. At the same time, the door panel of the present invention avoids using a large steel reinforcement, although it should be appreciated that a relatively small steel hinge pillar reinforcement may be bonded to the inner panel.

While the embodiments of the invention disclosed herein are presently considered to be preferred, various changes and modifications can be made without departing from the spirit and scope of the invention. For instance, joints according to the present invention can be formed for other body panels and structures including hoods, decklids, etc. The scope of the invention is indicated in the appended claims, and all changes that come within the meaning and range of equivalents are intended to be embraced therein.

What is claimed is:

1. A door panel for a motor vehicle, the door panel comprising:

a front portion comprising carbon fiber sheet molding compound; and a rear portion connected to the front portion, the rear portion comprising a glass fiber sheet molding compound.

2. The door panel of claim 1 wherein the front portion is connected to the rear portion by a molded joint.

3. The door panel of claim 2 wherein the molded joint is an overlap joint.

4. The door panel of claim 2 wherein the molded joint is an insert joint.

5. The door panel of claim 4 wherein a front section of the rear portion is inserted within a rear section of the front portion.

6. The door panel of claim 1 wherein the glass fiber sheet molding compound comprises low density sheet molding compound.

7. The door panel of claim 1 wherein the front portion comprises about 20% of the length of the door panel.

8. The door panel of claim 1 wherein the front portion consists essentially of carbon fiber sheet molding compound.

9. The door panel of claim 1 wherein the rear portion comprises about 80% of the length of the door panel.

10. The door panel of claim 1 wherein the rear portion consists essentially of low density sheet molding compound.

11. The door panel of claim 1 wherein the door panel is an inner door panel.

* * * * *